United States Patent [19]

Blanding

[11] Patent Number: 5,423,467
[45] Date of Patent: Jun. 13, 1995

[54] FILM REGISTRATION GATE ASSEMBLY

[75] Inventor: Douglass L. Blanding, Rochester, N.Y.

[73] Assignee: Eastman Kodak Company, Rochester, N.Y.

[21] Appl. No.: 192,913

[22] Filed: Feb. 7, 1994

Related U.S. Application Data

[62] Division of Ser. No. 903,837, Jun. 24, 1992, Pat. No. 5,328,074.

[51] Int. Cl.⁶ .................... B65H 23/02; B65H 20/18
[52] U.S. Cl. ......................... 226/3; 352/194; 355/76; 226/57
[58] Field of Search ............. 226/2, 3, 54, 55, 56, 226/57, 58, 59, 74, 75, 81; 352/225, 194; 355/75, 76

[56] References Cited

U.S. PATENT DOCUMENTS

| | | | |
|---|---|---|---|
| 2,418,943 | 4/1947 | Jones | 88/18.4 |
| 2,986,316 | 5/1961 | Petersen | 226/57 |
| 3,776,626 | 12/1973 | Lewis | 352/194 |
| 4,522,476 | 6/1985 | Renold | 352/225 |
| 4,835,555 | 5/1989 | Maxwell | 352/194 |

*Primary Examiner*—Daniel P. Stodola
*Assistant Examiner*—Thomas E. Dunn
*Attorney, Agent, or Firm*—Dennis R. Arndt

[57] ABSTRACT

A film registration gate assembly has a gate with focal positioning location for focal positioning of an image frame of a strip film with edge perforations. Undersized first and second pins enter a pair of transversely aligned perforations of the film to register the image frame with the positioning location. An undersized third pin enters a third perforation spaced along the film from the second pin and then pulls the film obliquely to a reference line extending between the first and second pins to nest against the first and second pins the perforations thereat and register the image frame precisely at the aperture. A plate with a window registering with the image frame and aperture clamps the film against the gate. The window, positioning location and image frame are of corresponding size and shape. The pins register the image frame precisely with the positioning location, and the plate maintains the image frame in precise focal position thereat.

4 Claims, 8 Drawing Sheets

FILM REGISTRATION GATE ASSEMBLY

This is a Divisional of application Ser. No. 07/903,837, field Jun. 24, 1992, now U.S. Pat. No. 5,328,074.

CROSS-REFERENCE TO RELATED APPLICATION

This application discloses and claims subject matter related to that disclosed and claimed in copending U.S. application Ser. No. 07/903,689, filed simultaneously herewith in the names of Douglass L. Blanding et al., entitled FILM REGISTRATION AND IRONING GATE ASSEMBLY.

FIELD OF THE INVENTION

This invention relates to a film registration gate assembly for strip film with edge perforations, and a method of use thereof.

BACKGROUND OF THE INVENTION

Typically, in using motion picture film for projecting, recording, printing, scanning and like purposes, the strip film is advanced to repeatedly register an image frame or an image frame to be created at a focal positioning location of a film gate for viewing or exposing the frame at an optical axis perpendicular to the plane of the frame location or aperture and intersecting the center of the frame location. The image frame is held in focal position at the frame location by a pressure plate, pads or similar clamping system providing a window for unobstructed viewing or exposing of the image frame at the aperture.

The strip film, whether a motion picture film or otherwise, is typically formed of longitudinally successive, uniform rectangular image frames bounded between a pair of parallel rows of equidistant, uniform rectangular edge perforations of common cross sectional size, each perforation in one row being transversely aligned with a corresponding perforation in the other row.

Each image frame is typically registered with the aperture or frame location by registration pins of about the same cross sectional size and shape as the edge projections of the strip film, and that enter into and are embraced by given perforations during the aligning of the image frame with the aperture. This accelerates wear of the pins and the perforations and also causes perforation tearing. As a result, play occurs between the worn pins and perforations, and/or between the pins and torn perforations, leading to imprecise registration of the image frame with the aperture. If undersized pins were initially used to offset these problems, imprecise registration of the image frame with the aperture would exist from the start, due to play between the pins and perforations.

This problem is acute in use of high resolution electronic scanning and printing systems, which require extremely precise location of the image frame at the imaging location or film gate aperture, especially for achieving special effects. The strip film must be maintained very straight, i.e., truly flat focally, along the optical scan line in order to remain in sharp focus. For this reason, the film is typically wrapped around a portion of a cylindrical (or cylindrical arc) surface defining a curved film gate having a gate aperture. The gate supports the perforated edges of the strip film so that the image frame is advanced to and positioned over the gate aperture or imaging location. A retractable clamp holds the image frame in position during use, and is retracted for advancing the next image frame.

In typical scan line operation, the curved gate is rotated about its cylindrical axis to traverse the scan line incrementally, i.e., one line at a time, for scanning each line portion of the image frame as the gate rotates relative to the scanner, printer or other system being used. As the scan line technique requires precise positioning of the image frame at each focal line thereof (as distinguished from its focal plane) during scanning (or recording), even slightly imprecise registration of the image frame at the gate is undesirable, as it detracts from the optical quality of operation. Tolerances of total film flatness of 0.002 inch, and frame to frame registration at the gate or aperture within 0.00025 inch (one pixel), are desirable.

Various film gate arrangements are known which register film image frames with a gate aperture, for projecting, recording, printing, scanning and the like operations. Examples of such arrangements are shown in the following prior art.

U.S. Pat. No. 4,575,226 (Zahn et al.) discloses a device for photographing varying size image frames of a microfilm strip to make a uniform size copy, via a fixed size aperture of a film gate on which a frame is seated by a plate with a variable size window.

U.S. Pat. No. 1,805,948 (Lane) discloses a motion picture film printer in which superimposed negative and positive strip films move in unison past a fixed size aperture of a curved film gate for exposure. A ring mask with different size windows is disposed rotatably at the aperture to vary the exposure size.

U.S. Pat. No. 4,161,365 (Anderson et al.) discloses a film negative holder for a photographic printer, formed of hinged plates with mating apertures. One plate has fixed pins and movable pins to align a negative with the apertures and the other has mating holes for the fixed pins and oversized holes for the movable pins.

U.S. Pat. No. 2,418,943 (Jones) discloses a motion picture projector or printer for strip film with parallel rows of transversely aligned edge perforations engaged by sprockets to move the image frames to the aperture of a film gate under the constant pressure of a plate. A pair of pins move into and out of given pairs of transversely aligned perforations to register each frame at the aperture. One pin is the same size as the perforations while the other pin is undersized transversely relative to the perforations so that both pins register the frame longitudinally whereas transverse play at the undersized pin permits the same size pin to register the frame laterally. This arrangement is prone to excess pin and perforation wear and perforation tearing.

U.S. Pat. No. 4,360,254 (Nyman et al.) discloses a slide production camera for strip film with edge perforations engaged by fixed pins on a film gate to register an image frame with the gate aperture. A reciprocating pressure pad seats the frame at the aperture on the pins, and stripper fingers on the pad lift the frame from the pins for advancing the film. This arrangement is prone to excess pin and perforation wear and perforation tearing.

U.S. Pat. No. 4,522,476 (Renold) discloses a motion picture camera or projector for strip film with edge perforations engaged by reciprocating pins passing through bores in a reciprocating pressure pad to register an image frame with the aperture of a film gate. Sloped tips on the pins enter adjacent perforations during film advance so that the pins fully engage the perforations at the end of the advance to register a frame at the aperture. Lifters raise the film from the gate and the pressure pad bores strip the perforations from the pins on retracting the pads and pins. This arrangement is prone to excess pin and perforation wear and perforation tearing.

Commonly assigned U.S. Pat. No. 3,712,725 (Eckerdt) discloses a slide projector with an adapter for projecting image frames of a strip film with sprocket driven edge projections. Each frame is registered at the aperture of a film gate and then seated by a frame gate that is retracted for film advance. This arrangement does not involve excess pin and perforation wear and perforation tearing.

Commonly assigned U.S. Pat. No. 3,418,042 (Sigl) discloses a crank driven claw that engages edge perforations of a strip film to advance the film for registering its image frames with the aperture of a film gate. The film is then held flat by a frame plate for exposure. This arrangement does not involve excess pin and perforation wear and perforation tearing.

It is desirable to avoid such pin and perforation wear and perforation tearing, yet register precisely each image frame of a strip film with the aperture of a film gate, and maintain the frame in precise focal position thereat.

SUMMARY OF THE INVENTION

The foregoing drawbacks have been obviated by use of registration means and pulling means to register precisely an image frame of a strip film with the imaging location of a film gate.

In accordance with the present invention, a film registration assembly is provided for focal positioning of an image frame of a strip film with edge perforations. Briefly, the assembly comprises a film gate having a focal positioning location, registration means for registering a pair of edge perforations of the film with a reference line extending from a first point to a second point adjacent the positioning location, and means at a third point for moving the film in a direction oblique to the reference line to register precisely the image frame with the positioning location by the registration means.

The registration means desirably includes a pair of undersized pins that freely enter a given pair of transversely aligned edge perforations on the strip film, and force applying means to move the film obliquely to align both perforations longitudinally against both pins and nest (corner) one perforation transversely against one pin, thus registering a film frame with the positioning location. A clamping means may also be included to maintain the registered frame in the focal position.

In particular, the assembly is used for focal positioning of longitudinally successive, uniform rectangular image frames bounded between a pair of parallel rows of equidistant, uniform rectangular edge perforations of common cross sectional size, on a strip film, each perforation in one row being transversely aligned with a corresponding perforation in the other row. The assembly specifically includes a gate member, registration means, and moving means.

The gate member has a front face and a rear face with a rectangular, focal positioning location. The positioning location is complemental to an image frame of the strip film and has longitudinally extending first and second transverse sides and transversely extending third and fourth longitudinal sides. The front face has film perforation seating, and film frame focal positioning, first and second surfaces correspondingly extending longitudinally along the first and second transverse sides.

The registration means has first and second pins of smaller cross sectional size than the film perforations. The pins are disposed perpendicular to the first and second surfaces in fixed alignment with a reference line extending transversely from a first point on the first surface to a second point on the second surface, and at a fixed longitudinal location adjacent one longitudinal side of the aperture. The disposition of the pins corresponds to the positioning of a pair of transversely aligned film perforations on the surfaces at the first and second points. The pins are arranged for entry into the perforations.

Means is provided for engaging the film at a position corresponding to a third point on the second surface spaced longitudinally from the second point for moving the film in a direction oblique to the reference line, upon entry of the pins into the perforations. This produces a resultant force on the perforation at the first point and on the perforation at the second point for registering precisely a film frame with the aperture by the pins.

The clamping means is arranged adjacent the front face for clamping against the first and second surfaces the film perforations adjacent the positioning location to maintain the frame in precise focal position at the positioning location.

The moving means advantageously includes resilient tension means arranged to produce a resultant force on the film at a transverse midpoint in alignment with the reference line. This force corresponds to a combination of a longitudinal force component and a transverse force component acting on the perforation at the first point to corner the perforation against the first pin in both longitudinal and transverse directions, and a longitudinal force component acting on the perforation at the second point to align the perforation against the second pin in the longitudinal direction.

More specifically, the third point corresponds to the positioning of a third film perforation on the second surface, and the pulling means includes a third pin arranged for entry into the perforation at the third point and for unhindered displacement in the oblique direction. Spring means are provided to pull the third pin in the oblique direction.

According to one embodiment, the three pins are arranged adjacent the front face for correspondingly moving from a retracted position toward the front face for entry into the perforations. Moving means are provided for correspondingly moving the pins.

The moving means may include a flexure cantilever support for the third pin having a holding flexure sheet and a locking flexure sheet. Each sheet has a fixed end and a movable end individually movable from a retracted position toward the front face. The movable end of the holding sheet has a depending post with a base portion connected thereto and an extremity portion of smaller cross section than the base portion and interconnected to the base portion by a frusto-conical portion. The extremity portion defines a free end carrying the third pin perpendicular to the second surface at the third point. The holding sheet is flexible to move the pin while restricting the pin from longitudinal and transverse displacement. The movable end of the locking sheet has a locking opening coaxially lockingly embracing the frusto-conical portion of the post. The locking sheet is flexible to move the locking opening away from the frusto-conical portion to release the post for displacing the third pin in the oblique direction.

Motion imparting means are provided for moving the movable end of the holding sheet to move the third pin, and for moving the movable end of the locking sheet to release the post.

The moving means may also include a unitary flexure cantilever support for the first and second pins. The support has a pair of parallel flexure sheets fixed against relative movement therebetween and forming a common fixed end and a common movable end movable from a retracted position toward the front face. The first and second pins depend from the movable end of the support perpendicular to the first and second surfaces at the first and second points. The parallel sheets are flexible to move the pins in unison while restricting each pin from longitudinal and transverse displacement.

Motion imparting means is also provided for moving the movable end of the support to move the first and second pins.

First, second and third clearance recesses may be defined in the first and second surfaces at the first, second and third points, and the pins arranged to move into the recesses upon entering the perforations.

According to an alternative embodiment, the clamping means forms a carrier for the film. The carrier is movable from a retracted position toward the front face. First, second and third clearance recesses may be defined in the carrier in registry with the first, second and third points. The first and second pins are fixed to the first and second surfaces. The third pin is arranged adjacent the rear face and extends through a clearance hole in the gate member to the front face. The three pins are arranged for entry into the recesses through corresponding film perforations upon moving the carrier toward the front face.

In general, the clamping means comprises a rigid plate movable from a retracted position toward the front face. The plate has a force applying portion with a rectangular window to clamp the film frame thereat, and a force receiving portion arranged to receive a clamping force for transmission to the force applying portion. The force receiving portion may be located on the plate adjacent the second surface to receive the clamping force at a pressure point adjacent the window.

A release pin may extend from the rear face through a bore in the gate member to the front face for movement to engage the force receiving portion of the plate in alignment with the pressure point to retract the plate. Clamp spring means may be arranged between the gate member and the plate at a counterpressure point remote from the window to provide a lifting force component forming a torque force with the received clamping force at the pressure point for enhanced clamping action. The clamp spring means may be preloaded to bias the plate to retracted position.

Force imparting means are provided for imparting a clamping force to the plate at the pressure point.

Typically, the gate member has a curved front face corresponding to an arc of a cylinder having an axis parallel to the longitudinal sides of the aperture.

The invention also concerns a method for positioning at a focal positioning location a frame of a strip film of the described type. The method comprises the steps of:

(A) isolating longitudinally a pair of transversely aligned film perforations of the strip film by the first and second pins at the first and second points along the reference line extending transversely of the longitudinal direction of the strip film and positioned at a fixed longitudinal location adjacent the film positioning location so as to register a film frame with the positioning location;

(B) applying a force to the film at at least the third point spaced longitudinally from the second point to create a force in a direction oblique to the reference line to produce a resultant force on the perforation at the first point and on the perforation at the second point for registering precisely the film frame with the positioning location by the pins.

The force is advantageously applied as a tension force to produce a resultant force on the film at the transverse midpoint in alignment with the reference line, as earlier described.

The method may also include the step of: (C) clamping the film adjacent the positioning location for maintaining the frame in precise focal position at the positioning location.

Step (B) may be effected before or after step (C), or steps (B) and (C) may be effected repeatedly sequentially for incrementally increasingly precise frame registry with and focal positioning at the focusing location.

The invention will be more readily understood from the following detailed description taken with the accompanying drawings and claims.

It is noted that the drawings are not to scale, some portions being shown exaggerated to make the drawings easier to understand.

DETAILED DESCRIPTION

Figure 1:
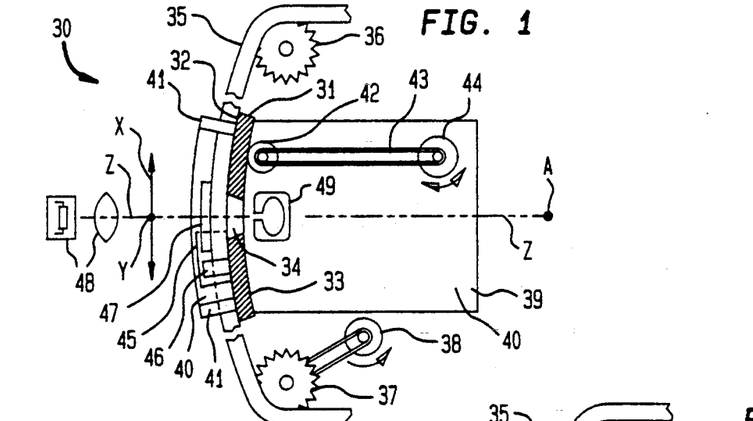
FIG. 1 is a top view of a film registration gate assembly in accordance with an embodiment of the invention as used for strip film image scanning.

Referring now to FIG. 1, there is shown a film registration gate assembly 30 in accordance with one embodiment of the invention used with a scanner system. Assembly 30 has a gate member 31, front face 32, rear face 33, film positioning location or aperture 34, strip film 35, supply and takeup sprockets 36 and 37, sprocket motor 38, gate mount 39, platform 40, arms 41, drive roller 42, belt drive 43, drive motor 44, registration means 45, pulling means 46, clamping means 47, scanner and lens system 48, illuminator 49, and axes A, X, Y and Z.

Figure 2:
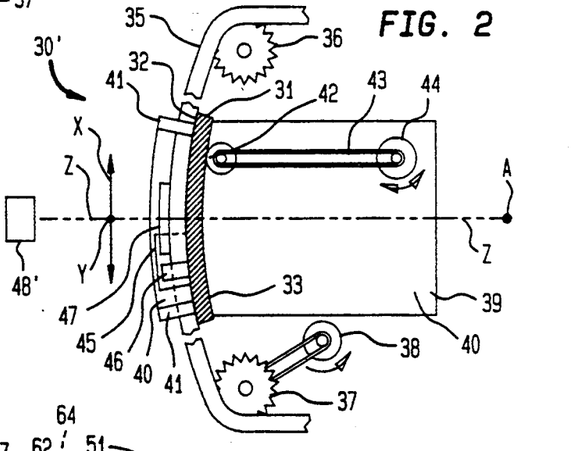
FIG. 2 is a view similar to FIG. 1 of the assembly as used for strip film image recording.

Referring now to FIG. 2, there is shown a recorder assembly 30' identical to the scanner assembly of FIG. 1, except that it is used with a recorder or printer light signal generator 48' instead of scanner and lens system 48 and illuminator 49.

While the description herein is directed to scanner assembly 30, it applies equally to recorder assembly 30'. As scanner and lens systems and recorder or printer systems are known, and operate in conventional manner with each assembly of the invention, such scanner and recorder or printer system operation need not be further described. In the scanner it is necessary to project light through the film onto a sensor and thus an aperture is necessary. However, when the apparatus is being used in a printer, such an aperture is not necessary and the registration location is referred to as the film positioning location.

Assembly 30 includes a curved gate member 31, shown in section in FIG. 1, having a curved front face 32 and rear face 33, with a through aperture 34 extending therebetween. Gate member 31 forms an arc portion of a cylinder having a rotational axis A. Assembly 30 is shown with gate member 31 extending vertically for rotation about a vertical axis A. However, it may be used in any spatial orientation, e.g., arranged for rotation about a horizontal axis A.

Gate member 31 is mounted for rotation on stationary gate mount 39, being rotatably supported upwardly by platform 40, radially outwardly by upright arms 41, and radially inwardly by drive roller 42. Drive roller 42 is supported by spring urged belt drive 43 to engage frictionally the upper edge of rear face 33. Belt drive 43 is operatively connected to drive motor 44, which is typically a stepper motor, for forward and reverse rotation, to rotate gate member 31 relative to mount 39 (and to the scanner) in forward direction for a given arc amplitude scanning cycle, and then in reverse direction for an equal return arc to the starting point for the next scanning cycle.

While the description herein refers to a movable gate member and stationary scanner, alternatively a movable scanner and stationary gate member may be used. This is because the scanning operation only requires relative motion therebetween. Typically, the reciprocating relative motion extends along an arc of about 20 degrees, but may be 30 degrees or more in extent.

Aperture 34 (or the equivalent film positioning location in the recorder assembly 30') defines a focal position for the image frames of strip film 35 and is complemental in size and shape thereto. As the radius of curvature of gate member 31 with respect to axis A is comparatively large relative to the longitudinal dimension of the film positioning location and of the image frames of film 35, in the direction of the longitudinal axis X (the running direction of film 35), the plane of the image frame at the film positioning location is essentially flat.

However, the scanner reciprocates along the transverse axis Y, in the same way as one reads a line of text, so that the scan line is perpendicular to axis X (and to the plane of the paper of FIG. 1). Thus, the film image at the film positioning location or aperture 34 is exactly parallel to the scan line throughout each scanning cycle. Scanning is effected in alignment with an optical axis which, as shown in FIG. 1, coincides with an axis Z extending in a radial direction through aperture 34. Axis Z is perpendicular to each of axes A, X and Y, so that axes A and Y are perpendicular to axes X and Z, and are parallel to each other.

As used herein, axes X, Y and Z refer to the spatial orientation of a given reference point or to a given direction, relative to axis A, and the reference point may have a degree of freedom in a linear direction along, or in a rotational direction about, a given axis X, Y or Z. Axes X, Y and Z are perpendicular to each other, whether axis Z coincides with the optical axis through aperture 34 or is otherwise located. In all cases, an axis X extends in a plane which is perpendicular to and intersects axes A and Y, and indicates the longitudinal (length) direction, while an axis Y is parallel to and extends in a common plane with axis A, and indicates the transverse (width) direction, and an axis Z is perpendicular to and intersects axes A and Y, and indicates a (thickness) direction toward and away from axis A.

Film 35 is mounted between feed sprocket 36 and takeup sprocket 37. Sprocket 37 is driven by sprocket motor 38 to advance film 35 in the longitudinal running direction of axis X. Sprocket motor 38 is typically a stepper motor. Initially, while gate member 31 is stationary at the starting point, film 35 is advanced by sprocket motor 38 to position an image frame at aperture 34. Then, sprocket motor 38 and drive motor 44 operate at concordant speeds to advance film 35 while in contact with front face 32, and to rotate gate member 31 in forward direction, in unison, for a scanning cycle. At the end of the cycle, while film 35 is stationary, drive motor 44 rotates in reverse direction to return gate member 31 to the starting point for the next scanning cycle.

Figure 3:
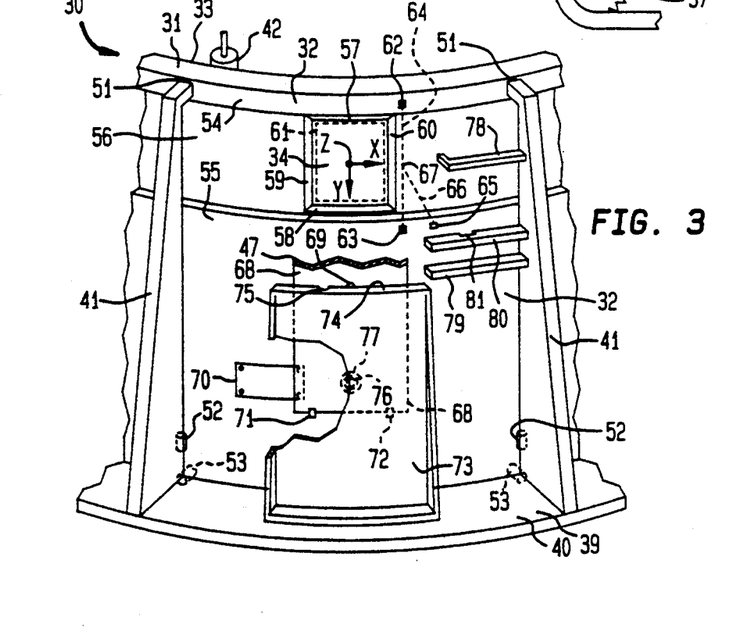
FIG. 3 is a schematic view of portions of the assembly of FIG. 1, and showing the clamping means on the gate member.

Referring now to FIG. 3, there is shown an assembly 30 including a gate member 31, front face 32, rear face 33, aperture 34, gate mount 39, platform 40, arms 41, drive roller 42, clamping means 47, arm rollers 51 and 52, platform rollers 53, first and second surfaces 54 and 55, groove 56, first and second transverse sides 57 and 58, third and fourth longitudinal sides 59 and 60, mask 61, first and second recesses 62 and 63, reference line 64, third recess 65, oblique line 66, midpoint 67, clamping plate 68, boss 69, connector 70, fingers 71 and 72, clamping cam 73, cam edge 74, clamping cam notch 75, spring 76, bore 77, registration cam 78, holding cam 79, locking cam 80, and locking cam notch 81.

FIG. 3 shows the positioning of gate member 31 of assembly 30 on gate mount 39 for limited arc reciprocal rotation on upper and lower arm rollers 51 and 52, and platform rollers 53. Upper rollers 51 act against the upper edge of longitudinally extending first surface 54 on front face 32, and lower rollers 52 act against the lower edge of longitudinally extending second surface 55 on front face 32, to stabilize the force of drive roller 42 against rear face 33. Platform rollers 53 act against the underside of gate member 32.

Aperture 34 is located in a longitudinally extending flat groove 56 that separates first and second surfaces 54 and 55. The adjacent portions of first and second surfaces 54 and 55 at groove 56 serve as longitudinal rails for the edge perforation portions of film 35 to space the middle image frame portion thereof from gate member 31 to prevent scratching of the image frames. Aperture 34 is of complementary rectangular size and shape to the image frames of film 35, having longitudinally extending first and second parallel transverse sides 57 and 58, and transversely extending third and fourth parallel longitudinal sides 59 and 60. Longitudinal sides 59 and 60 are parallel to rotational axis A.

Aperture 34 defines a focal position for the image frames of film 35, in conjunction with the adjacent portions of first and second surfaces 54 and 55 which extend longitudinally along first and second transverse sides 57 and 58, to define film perforation seating, and film frame focal positioning, rails.

A removable insert mask 61 (shown in dashed line in FIG. 3) may be provided optionally in aperture 34 to change its dimensions to conform to image frames of different size, in known manner.

A first recess 62 is formed at a first point in first surface 54 and a second recess 63 is formed at a second point in second surface 55 in alignment with an imaginary reference line 64 (shown in dashed line in FIG. 3) extending transversely from the first to the second points. Reference line 64 is situated at a longitudinal location adjacent longitudinal fourth side 60 of aperture 34. First and second recesses 62 and 63 correspond to the positioning of a pair of transversely aligned film perforations at the first and second points on first and second surfaces 54 and 55.

A third recess 65 is formed at a third point in second surface 55 spaced longitudinally from second recess 63 at the second point, the third point corresponding to the positioning of a third film perforation on second surface 55 of front face 32. Third recess 65 is located so as to define an oblique resultant force line (oblique direction) 66 (shown in dashed line in FIG. 3) extending to the midpoint 67 of reference line 64.

Clamping means 47 includes a rigid clamping plate 68 having a pressure boss 69 aligned transversely with the center of aperture 34, and mounted in a retracted position on front face 32 by a flexure sheet connector 70 and fingers 71 and 72. A clamping cam 73 having a cam edge 74 with a cam notch 75 is stationarily fixed to platform 40 in front of plate 68 for sliding contact with boss 69 as gate member 31 rotates relative to mount 39 to exert a clamping force on plate 68 to clamp an image frame of film 35 at aperture 34. A preloaded biasing spring 76 located in a blind bore 77 (both shown in dashed line in FIG. 3) in gate member 31 urges plate 68 away from front face 32 and against fingers 71 and 72.

Flexure sheet connector 70 comprises a resilient sheet, e.g., of metal or plastic, which cannot be displaced within its own plane but which can be flexed in a direction crosswise of its plane. Upon removing the flexing force, the sheet normally returns to its unflexed disposition. Connector 70 is fixed to gate member 31 and plate 68 to permit plate 68 to move toward front face 32, i.e., inwardly in the axis Z direction, as connector 70 flexes out of its own plane under the force of cam 73 acting on boss 69, but which restricts plate 68 from longitudinal and transverse displacement in the X and Y axes directions, and from rotation about a corresponding axis Z. In conjunction with the resilient property of connector 70 to return to unflexed disposition upon being relieved of the force of cam 73 acting on boss 69, biasing spring 76 aids in retracting plate 68 in the opposite direction until fingers 71 and 72 stop plate 68 from further outward movement.

As fixed to gate member 31, connector 70 has no degree of freedom linearly along or rotationally about X and Y axes, nor rotationally about a Z axis, and is only movable in a Z axis direction.

Connector 70 comprises moving means for plate 68, and clamping cam 73 comprises motion imparting means for moving plate 68 via such moving means from a retracted position toward front face 32 to clamp plate 68 against an image frame of film 35 at aperture 34.

A registration means cam 78, a pulling means holding cam 79, and a pulling means locking cam 80 with a locking cam notch 81, are respectively stationarily fixed to one arm 41 of mount 39, whose functions are later described.

Figure 4:
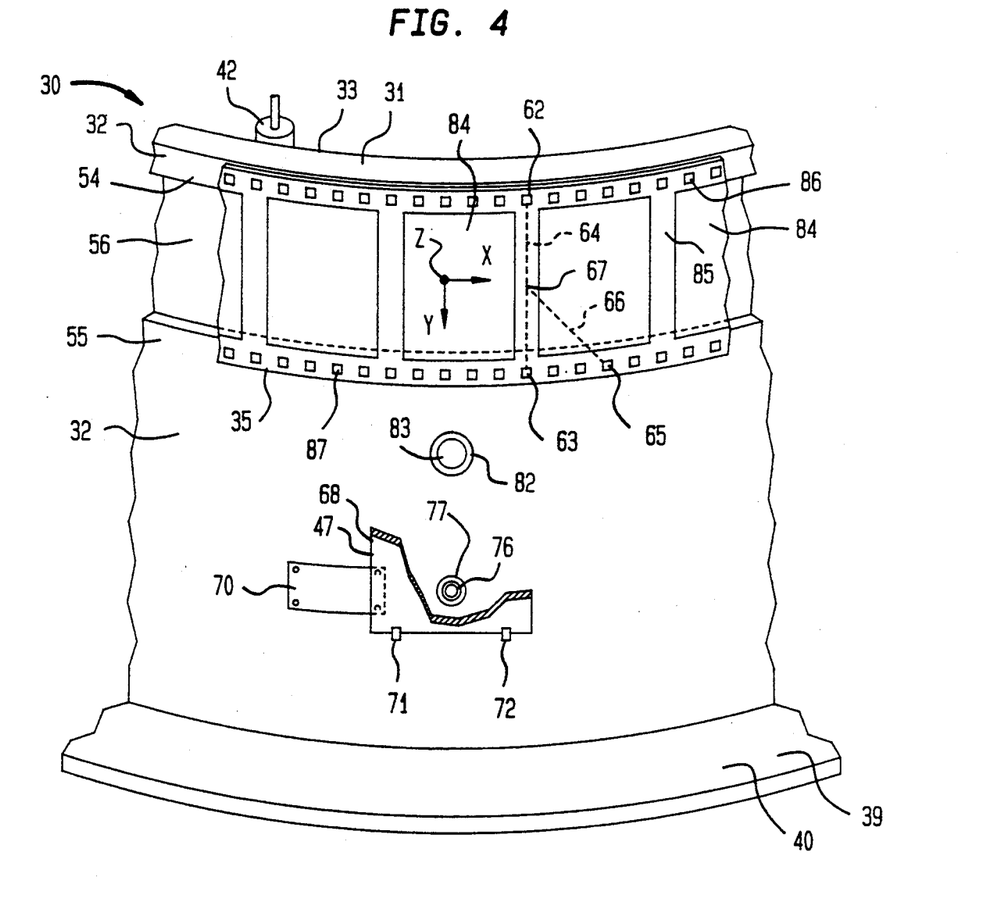
FIG. 4 is a view similar to FIG. 3, with some parts omitted, and showing the positioning of a strip film on the gate member.

Referring now to FIG. 4, there is shown the assembly 30 of FIG. 3, with some parts omitted for clarity, but including a gate member 31, front face 32, rear face 33, film 35, mount 39, platform 40, drive roller 42, first and second surfaces 54 and 55, groove 56, reference line 64, oblique line 66, midpoint 67, plate 68, connector 70, fingers 71 and 72, and spring 76 and bore 77. Also shown are a through bore 82, release pin 83, image frames 84, frame dividers 85, and first and second rows of edge perforations 86 and 87.

Film 35 is positioned on gate member 31 with its first row of perforations 86 extending along first surface 54 and its second row of perforations 87 extending along second surface 55 so as to span groove 56, and thus prevent scratching of the image frames against gate member 31. An image frame 84 in shown in overlying registry with aperture 34 (not shown).

Through bore 82 extends from rear face 33 to front face 32 at second surface 55 and adjacent aperture 34. Through bore 82 is aligned with boss 69 at a position closer to aperture 34 than blind bore 77. Through bore 82 and boss 69 are transversely aligned with blind bore 77 in a radial plane in the direction of axis Y and intersecting axis A, to position release pin 83 and spring 76 therebelow in transversely centered relation to the image frame 84 registered with aperture 34.

Figure 5:
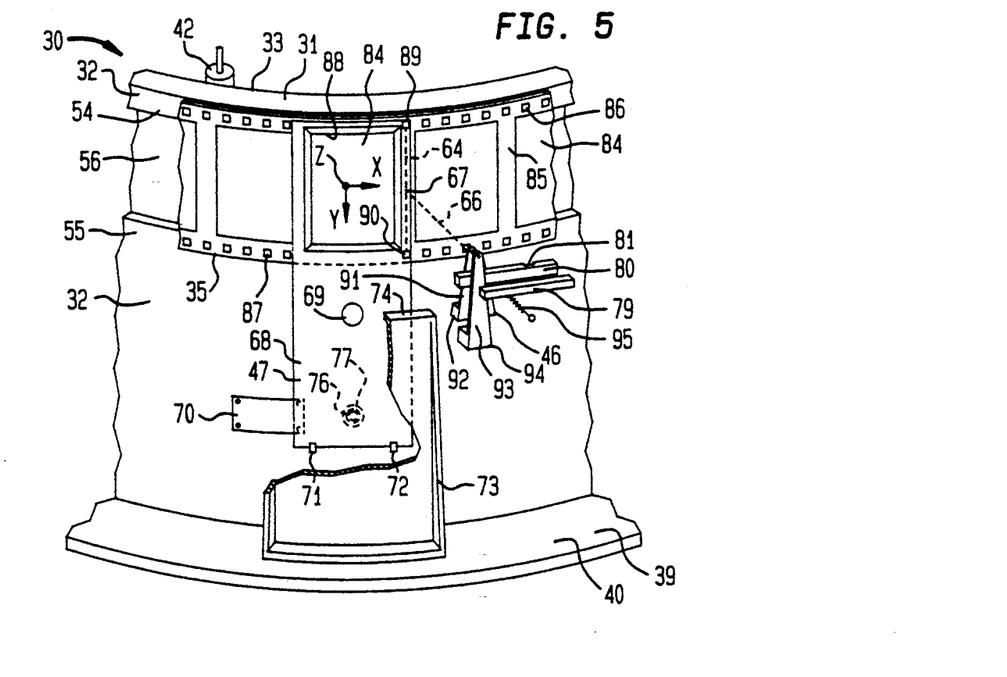
FIG. 5 is a view similar to FIG. 3, showing the pulling means.

Referring now to FIG. 5, there is shown the assembly 30 of FIG. 3, with some parts indicated in greater detail, including plate 68, but with portions of clamping cam 73 omitted, and including certain parts shown in FIG. 4. Also shown are a rectangular window 88, first and second holes 89 and 90, locking flexure sheet 91 and its rigid stand 92, holding flexure sheet 93 and its rigid stand 94, and pulling spring 95.

Window 88 is defined in plate 68 and is complemental to and overlies aperture 34. First and second holes 89 and 90 are defined in plate 68 and are complemental to and overlie first and second recesses 62 and 63 in first and second surfaces 54 and 55. Each of locking flexure sheet 91 and holding flexure sheet 93, like connector 70, comprises a resilient sheet, e.g., of metal or plastic, which cannot be displaced within its own plane but which can be flexed in a direction crosswise of its plane, and which normally returns to its unflexed disposition upon removing the flexing force. Locking sheet 91 and flexure sheet 93 form part of pulling means 46.

Locking sheet 91 is stationarily fixed by rigid stand 92 to gate member 31 and holding sheet 93 is stationarily fixed by rigid stand 94 to gate member 31 to permit each of sheets 91 and 93 individually to move toward front face 32, i.e., inwardly in an axis Z direction as each sheet flexes out of its own plane under the corresponding camming action of locking cam 80 and holding cam 79 during movement of gate member 31. However, but for the action of pulling spring 95, as later described, each of locking sheet 91 and holding sheet 93 is restricted from longitudinal and transverse displacement in the directions of axes X and Y, and from rotation about respective axes Z. Locking and holding sheets 91 and 93 normally retract to unflexed starting position when relieved of the camming action of locking and holding cams 80 and 79.

Figure 6:
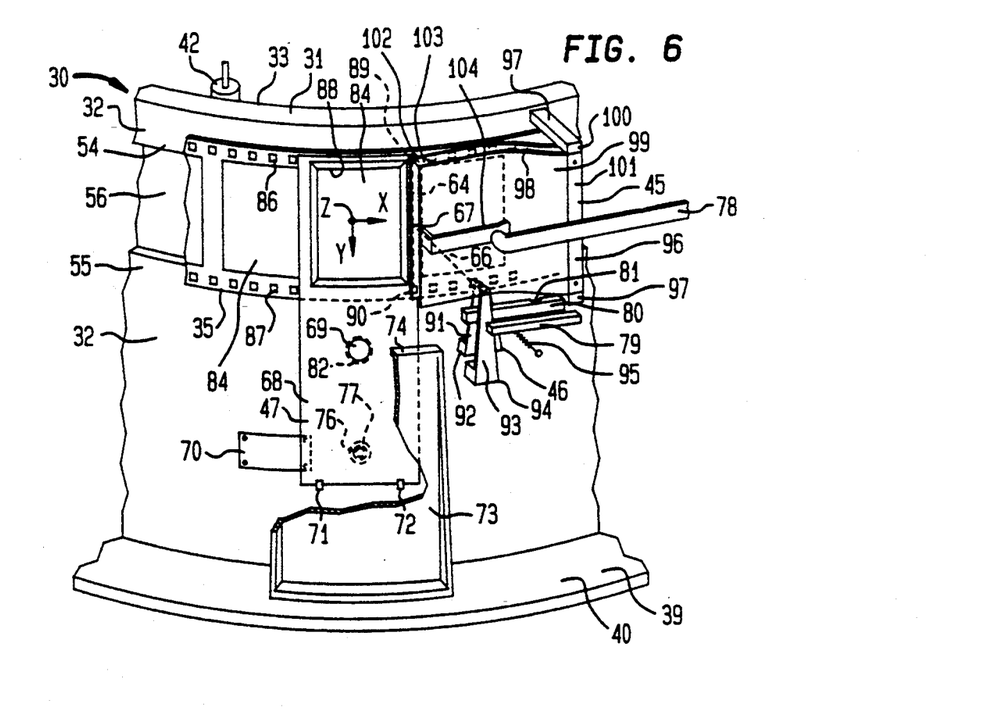
FIG. 6 is a view similar to FIG. 3, showing the registration means.
Figure 7:
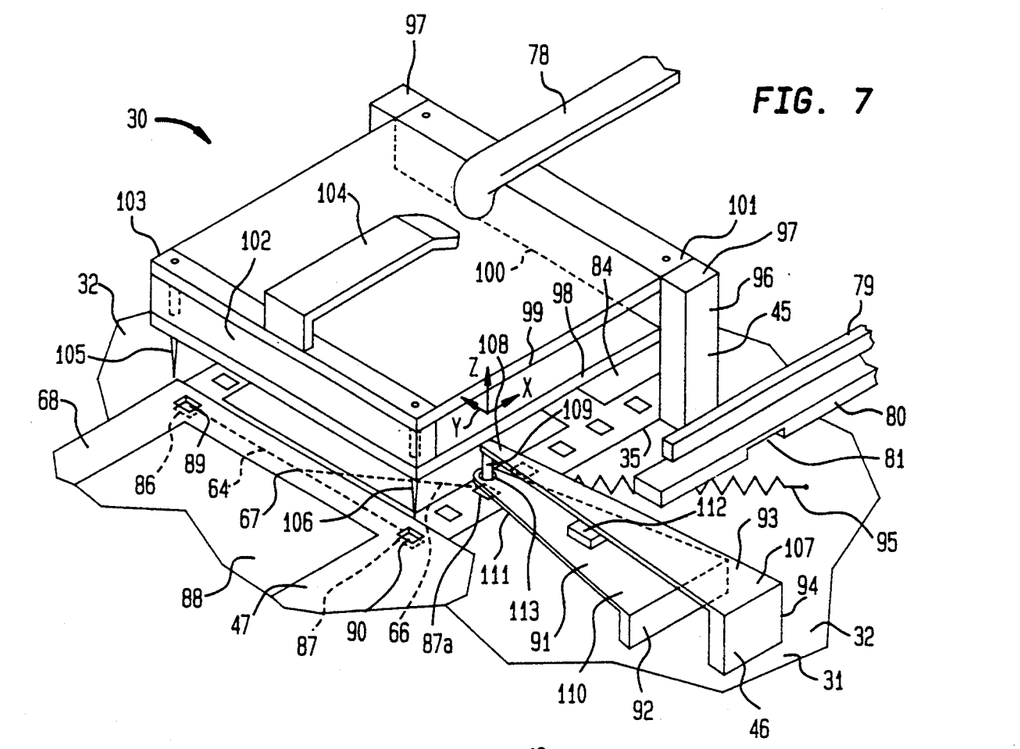
FIG. 7 is a perspective view of the registration means and pulling means.

Referring now to FIGS. 6 and 7, there is shown the assembly 30 of FIG. 3, with some parts of registration means 45 indicated in greater detail, and including some parts shown in FIGS. 4 and 5. In this case, registration means 45 is shown with a cantilever support 96, rigid bridge 97, inner and outer flexure sheets 98 and 99, base block 100, fixed end 101, free block 102, movable end 103, and registration cam follower 104.

Cantilever support 96 comprises a unitary flexure cantilever support having a rigid bridge 97 stationarily fixed to gate member 31 at first and second surfaces 54 and 55 so as to overlie and straddle film 35, and a pair of parallel inner and outer flexure sheets 98 and 99. Each of flexure sheets 98 and 99 comprises a resilient sheet similar to sheet connector 70, e.g., of metal or plastic, which cannot be displaced within its own plane but which can be flexed in a direction crosswise of its plane. Upon removing the flexing force, each of sheets 98 and 99 normally returns to unflexed disposition.

Sheets 98 and 99 are fixed against relative movement therebetween by base block 100 fixed to bridge 97 at their common fixed end 101, and by free block 102 at their common movable end 103. A cantilever cam follower 104 extends longitudinally from the midportion of outer sheet 99 on free block 102 at movable end 103 toward fixed end 101 for sliding contact with registration cam 78 as gate member 31 rotates relative to mount 39.

Registration cam 78 exerts a camming force on cam follower 104 which moves the movable end 103 of support 96, and thereby sheets 98 and 99 in unison, from a retracted position toward front face 32. Removing the camming force of registration cam 78 causes movable end 103, and thereby sheets 98 and 99 in unison, to retract from front face 32 as sheets 98 and 99 return to their normal unflexed disposition. During such movement, each part of movable end 103 is restricted from longitudinal and transverse displacement, and from rotation about an axis Z at any point along the transverse extent of free block 102.

As fixed to each other and to gate member 31, inner and outer sheets 98 and 99 have no degree of freedom linearly along or rotationally about X and Y axes, nor rotationally about a Z axis, and are only movable in unison is a Z axis direction.

Support 96 comprises moving means and registration cam 78 comprises motion imparting means for moving such moving means from a retracted position toward front face 32.

Referring now to FIG. 7, there is shown the assembly 30 of FIG. 3, in particular relation to the arrangement of parts in FIG. 6, with some parts of registration means 45 and pulling means 46 indicated in greater detail. In this case, registration means 45 is shown with first and second pins 105 and 106, and pulling means 46 is shown with holding sheet fixed and movable ends 107 and 108, post 109, locking sheet fixed and movable ends 110 and 111, locking cam follower 112, and locking opening 113.

First and second pins 105 and 106 depend from movable end 103 of support 96 perpendicular to surfaces 54 and 55 at first and second points at which first and second recesses 62 and 63 are located below first and second holes 89 and 90 in plate 68. Upon displacement of the movable end 103 of support 96 toward front face 32, first and second pins 105 and 106 pass through first and second holes 89 and 90, enter corresponding perforations 86 and 87 positioned at the first and second points registering with recesses 62 and 63, and in turn enter the recesses. The diameter of pins 105 and 106 is chosen to be smaller than both dimensions of the perforations and have clearance from all sides of the holes 89 and 90, and recesses 62 and 63. Due to the fixed disposition of inner and outer sheets 98 and 99, each of pins 105 and 106 is restricted from longitudinal and transverse displacement in the directions of axes X and Y, and from rotation about a corresponding Z axis at the first and second point locations of first and second recesses 62 and 63, upon moving movable end 103 toward front face 32.

Figure 8:
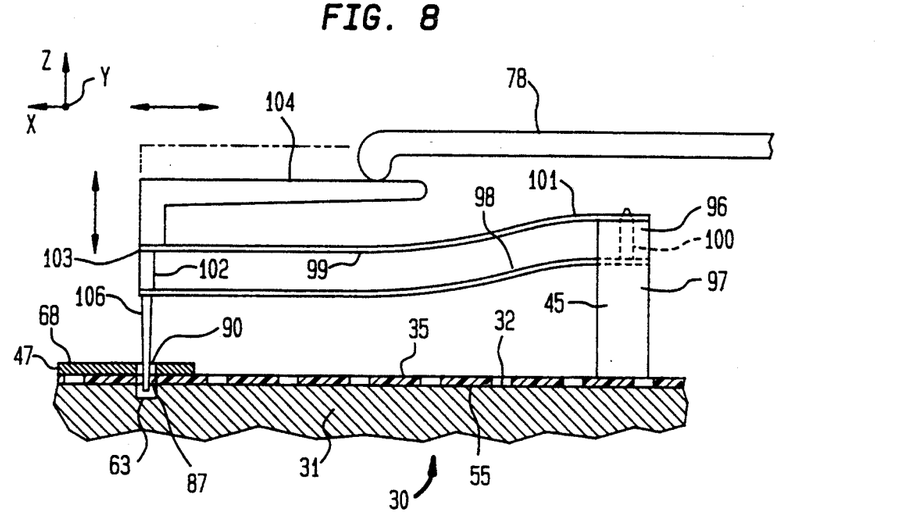
FIG. 8 is a schematic side view of the registration means shown in FIG. 7.

Referring now to FIG. 8, there is shown in partial section, the portion of registration means 45 depicted in FIG. 7, and illustrating the displaced position of the movable end 103 of support 96. Registration cam 78 engages registration cam follower 104 to force first and second pins 105 and 106 through first and second holes 89 and 90 in plate 68, and corresponding perforations 86 and 87 at the first and second points, into first and second recesses 62 and 63 for precise alignment of pins 105 and 106 with reference line 64. (Only pin 106, hole 90 and recess 63 are illustrated.)

Figure 9:
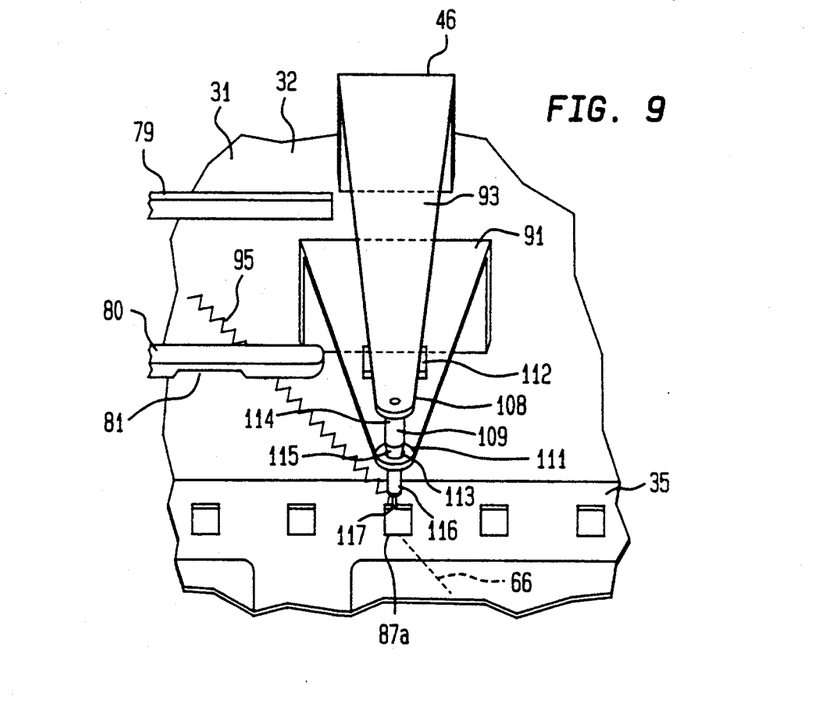
FIG. 9 is a perspective view of the pulling means as seen from the opposite direction to that shown in FIG. 7.

Referring now to FIG. 9, there is shown the portion of pulling means 46 depicted in FIG. 7, and illustrating from the opposite direction the disposition of the pertinent parts. Also shown are a base portion 114, frustoconical portion 115 and extremity portion 116 of post 109, plus a third pin 117 at the end thereof.

As gate member 31 rotates relative to mount 39, holding cam 79 slidably engages the outer surface of holding sheet 93 to move its movable end 108 from a retracted position toward front face 32 thereby also moving locking sheet 91 in unison therewith via post 109 which depends from movable end 108 of holding sheet 93. The intermediate frusto-conical portion 115 of post 109 normally seats in locking opening 113 on movable end 111 of locking sheet 91. Thus, inward movement of post 109 toward front face 32 under the action of holding cam 79 on holding sheet 93, causes movable end 111 of locking sheet 91 to move third pin 117 into a corresponding perforation 87a at the third point at which third recess 65 is located and in turn into the third recess with clearance in all directions from the sides of the recess.

Third pin 117 has a cross section smaller than the dimensions of the perforations. As pin 117 enters the third recess 65, locking cam 80 reaches and engages locking cam follower 112, to move movable end 111 of locking sheet 91 further toward front face 32 independently of the now flexed and stationary holding sheet 93. This causes the unseating of locking opening 113 from frusto-conical portion 115 of post 109 and movement onto the extremity portion 116 which has a smaller cross section than base portion 114 of post 109. In turn, extremity portion 116 is pulled by pulling spring 95 in oblique direction 66. This pulling action of spring 95 causes third pin 117 to pull against the perforation 87a located thereat for precisely aligning the perforations entered by the first and second pins 105 and 106 in desired manner as described below. Third recess 65 is sized to permit unhindered movement of third pin 117 in oblique direction 66 under the pulling action of spring 95, i.e., in a direction away from midpoint 67.

Holding sheet 93 is arranged in overlying parallel relation to locking sheet 91, so that post 109 depends from movable end 108 of holding sheet 93 and is inserted coaxially along a Z axis direction into locking opening 113 on movable end 111 of locking sheet 91. Third pin 117 is also coaxially carried on the free end of extremity portion 116 of post 109. Movable ends 108 and 111 are restrained from displacement in the longitudinal and transverse directions of axes X and Y, and from rotation about the Z axis, thus restraining third pin 117 in like manner when it is held by the locking opening 113 of locking sheet 91. Extremity portion 116 of post 109 is of smaller cross section than both base portion 114 and locking opening 113. Frusto-conical section 115, which interconnects base portion 114 and extremity portion 116, is of intermediate cross section relative to the cross sections of base portion 114, extremity portion 116 and locking opening 113.

This relative sizing and coaxial positioning of the coacting parts on, and the parallel relationship of, holding sheet 93 and locking sheet 91 permit holding sheet 93 to be depressed a first increment toward front face 32 by holding cam 79 before locking cam 80 reaches locking sheet 91. The action of holding cam 79 against holding sheet 93 simultaneously causes locking sheet 91 to be equally depressed a first increment, as frusto-conical portion 115 is coaxially lockingly embraced by locking opening 113 when sheets 93 and 91 are in normal unflexed disposition. This causes third pin 117 to enter the adjacent perforation 87a and reach third recess 65. Then locking cam 80 depresses locking sheet 91 a further increment while holding sheet 93 remains at the first increment depressed position. This releases frusto-conical portion 115 from nesting relation with locking opening 113 and subjects third pin 117 to the pulling action of spring 95 in oblique direction 66.

Thus, the motion of locking opening 113 toward front face 32 effects two separate actions regarding third pin 117. First, when depressed a first increment under the action of frusto-conical portion 115 of post 109, locking opening 113 causes third pin 117 to enter the adjacent perforation 87a while restraining the pulling action of spring 95. Second, when further depressed a second increment, locking opening 113 is released from frusto-conical portion 115 to subject third pin 117 to the pulling action of spring 95 for applying tension to achieve the desired cornering and nesting action on film 35 as later described. The third pin 117 is movable, when unlocked, by the force of spring 95 by slightly deflecting the end of holding sheet 93 to which post 109 is attached.

As third pin 117 is of smaller cross section than extremity portion 116, the transition therebetween defines a shoulder that can rest on film 35 at the margin of the adjacent perforation 87a as third pin 117 enters the perforation and reaches third recess 65 therebelow. This resting contact may cause friction between film 35 and second surface 55 that inhibits the desired reliable seating, i.e., cornering or nesting, action. To avoid this condition, the bottom of third recess 65 can be sized relative to the length of third pin 117 to engage the tip of the third pin as a stop before the shoulder of extremity portion 116 reaches film 35. Any other stop means may be used for this purpose.

On retracting locking sheet 91 and holding sheet 93 for return of gate member 31 to the starting position, locking sheet 91 may first be disengaged from locking cam 80 so that locking opening 113 returns upwardly to renest against and reembrace lockingly frusto-conical portion 115. At the same time, third pin 117 is retracted from third recess 65 and from the adjacent perforation 87a. This renesting action overcomes the pulling force of spring 95, and returns third pin 117 to locked condition. Then, holding sheet 93 may be disengaged from holding cam 79 so that both holding sheet 93 and locking sheet 91 return upwardly to unflexed disposition.

Third pin 117 is mounted on the free end of extremity portion 116 and is coaxial with post 109 and locking opening 113 to extend in a Z axis direction and to move along that axis into third recess 65. The axis of third pin 117 and the axes of first and second pins 105 and 106 are parallel to each other, and are maintained parallel to each other and perpendicular to front face 32 in any position of movement thereof. This is due to the restriction of inner and outer sheets 98 and 99 of support 96, and the restriction of holding and locking sheets 93 and 91 on rigid stands 94 and 92, against longitudinal and transverse displacement. First and second pins 105 and 106 are perpendicular to first and second surfaces 54 and 55 at first and second recesses 62 and 63 along reference line 64, and third pin 117 is perpendicular to second surface 55 at third recess 65 spaced longitudinally from reference line 64.

As fixed to gate member 31, each of holding sheet 93 and locking sheet 91 has no degree of freedom linearly along, or for all practical purposes, rotationally about X and Y axes, nor rotationally about a Z axis, and is only movable in a Z axis direction.

Holding sheet 93 on rigid stand 94 and locking sheet 91 on rigid stand 92 comprise a dual flexure conjoint moving means, and holding cam 79 and locking cam 80 comprise conjoint motion imparting means for moving such conjoint moving means from a retracted position toward front face 32 to move third pin 117 into a corresponding perforation 87a at third recess 65 as desired.

Alternatively, holding sheet 93 and locking sheet 91 may be arranged relative to cantilever support 96 so that the upward return motion of locking opening 113 on movable end 111 of locking sheet 91 is used to engage and lift movable end 103 of cantilever support 96 in conjunction with the release of registration cam follower 104 from engagement with registration cam 78.

Figure 10:
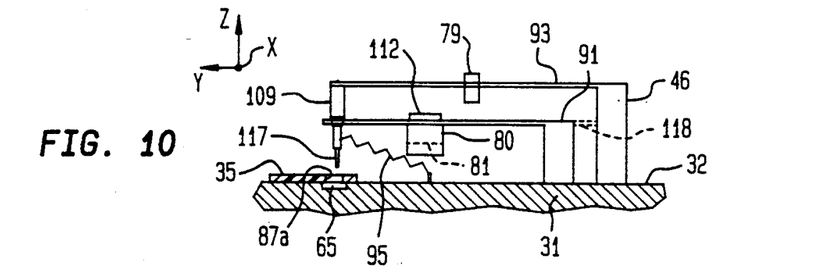
FIGS. 10, 11 and 12 are schematic views showing successive stages of operation of the pulling means.
Figure 11:
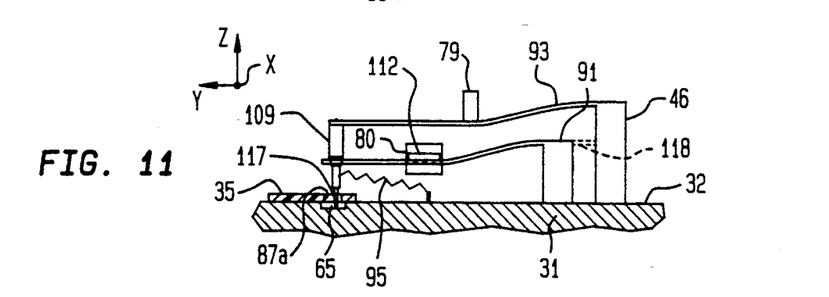
Figure 12:
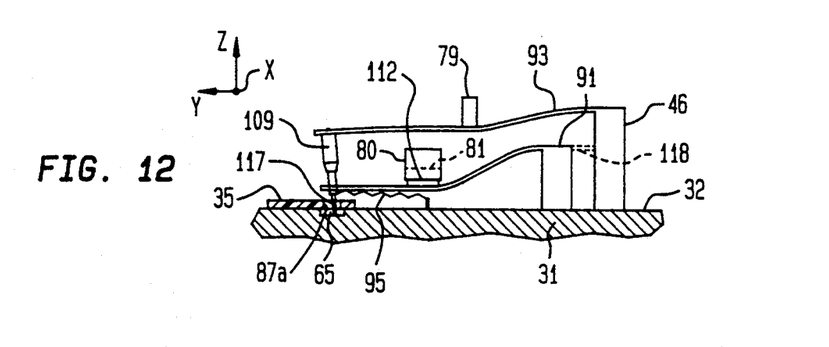

Referring now to FIGS. 10, 11 and 12, there are shown the successive stages in the operation of holding sheet 93 and locking sheet 91 for moving third pin 117 into third recess 65 and for pulling third pin 117 in oblique direction 66 to register an image frame 84 precisely at aperture 34. Also shown is an optional common rigid stand connector 118. In FIG. 10, third pin 117 is in retracted position, and extends along an axis Z perpendicular to film 35 on front face 32. In FIG. 11, holding cam 79 engages and forces holding sheet 93 a first increment toward front face 32, so that post 109 in turn forces locking sheet 91 in the same direction to cause third pin 117 to enter the perforation at third recess 65. In FIG. 12, locking cam 80 engages locking cam follower 112 and forces locking sheet 91 a second increment further toward front face 32 while holding sheet 93 remains at the first increment position. This causes post 109 to be released from locking engagement with locking sheet 91, whereupon spring 95 pulls post 109 so as to tilt it slightly (rotationally about an X axis) under tortional flexing of holding sheet 93. As a result, third pin 117 pulls film 35 via the perforation at third recess 65 to register the image frame 84 at aperture 34 precisely therewith via seating contact of the corresponding perforations with first and second pins 105 and 106.

Optionally, rigid connector 118 (shown in dashed line in FIGS. 10-12) may be provided to interconnect rigid stands 92 and 94 as a common rigid stand for locking sheet 91 and holding sheet 93, yet enabling each sheet to move independently in an axis Z direction.

Figure 13:
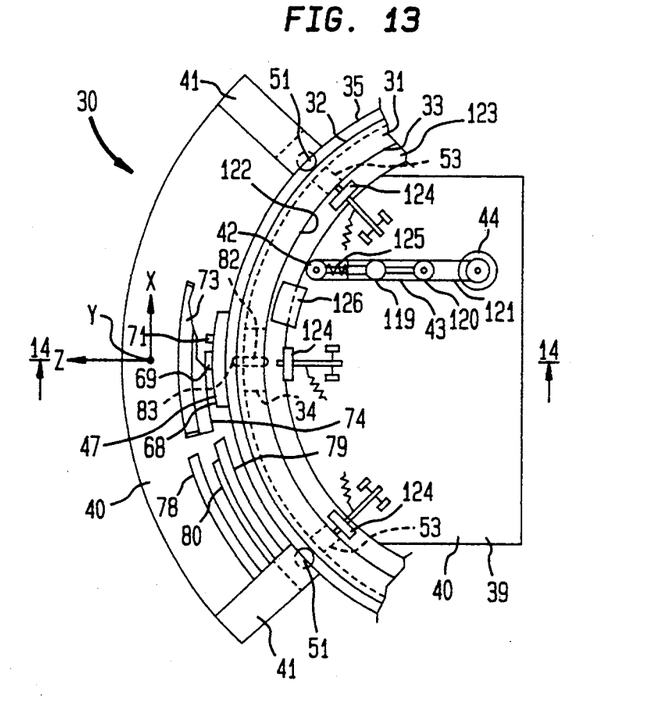
FIG. 13 is a top view of the assembly of FIG. 3.
Figure 14:
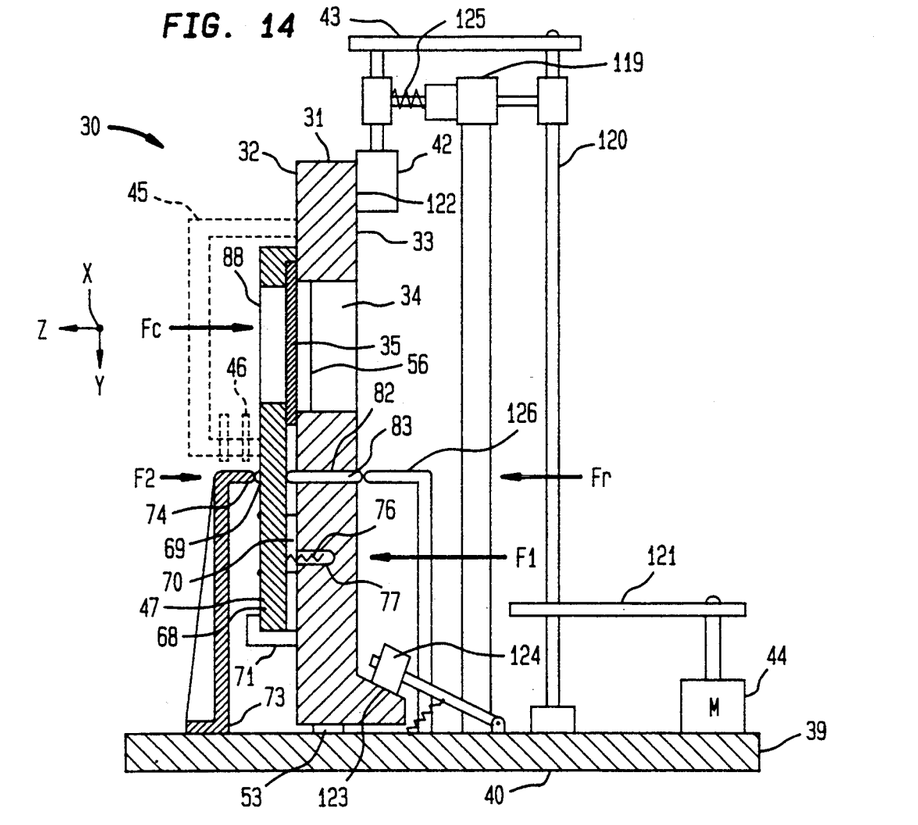
FIG. 14 is a sectional view taken on line 14—14 of FIG. 13.

Referring now to FIGS. 13 and 14, assembly 30 is shown with the same parts as discussed above, and also including a drive bracket 119, drive shaft 120, belt drive 121, flat course 122, ramp course 123, ramp rollers 124, drive spring 125, and release pin cam 126. Also shown are forces F1, F2, Fc and Fr.

Drive bracket 119 is fixed to platform 40 to support belt drive 43 which operatively connects drive roller 42 with drive shaft 120. Shaft 120 is operatively connected by belt drive 121 with drive motor 44. Rear face 33 of gate member 31 has a flat course 122 at its upper end which is engaged by drive roller 42, and a ramp course 123 at its lower end which is engaged by spring urged ramp rollers 124. Drive spring 125 on drive bracket 119 urges drive roller 42 against flat course 122 to drive gate member 31 in forward (and return) direction relative to rotational axis A for accurate scanning of an image frame 84 at aperture 34.

Front face 32 is supported against upper and lower arm rollers 51 and 52 at spaced locations that define the rotational path of gate member 31 relative to rotational axis A. The underside of gate member 31 is supported on bottom rollers 53 at spaced locations to prevent its axial displacement relative to the scanner. Spring urged ramp rollers 124 act on ramp course 123 to nest gate member 31 against arm rollers 51 and 52.

Release pin cam 126 is stationarily fixed to platform 40 at rear face 33 to engage the rear end of release pin 83 to force it forwardly in through bore 82 to cause its front end to lift plate 68 to retracted position against fingers 71 and 72, in conjunction with the biasing force of spring 76 in blind bore 77. Release pin cam 126 and clamping cam 73 are positioned at rotationally offset points on platform 40 on opposed sides of gate member 31 to operate in concordant sequence. When gate member 31 rotates in forward direction for scanning, clamping cam 73 is engaged with boss 69 on plate 68, and release pin cam 126 is disengaged from release pin 83. The sequence is reversed when gate member 31 rotates in reverse direction for return to the starting position, so that plate 68 is retracted to permit advance of film 35.

Pins 105, 106 and 117 are concordantly moved toward front face 32 during clamping of plate 68 for corresponding scanning, and are retracted therefrom with unclamping of plate 68 for advance of film 35 and return of gate member 31 to the starting position.

When plate 68 is clamped against film 35 by clamping cam 73, it is subjected to an outward lifting force F1 by preloaded biasing spring 76 at a counterpressure point transversely below boss 69 and remote from window 88, and to a separate inward force F2 by clamping cam 73 on boss 69 at a pressure point adjacent window 88, both points being located on a lower force receiving portion of plate 68 adjacent second surface 55. This creates an effective clamping torque force Fc transmitted to an upper force applying portion of plate 68 at which window 88 is located, and which is applied functionally at the center of aperture 34, for enhanced clamping of rectangular window 88 against the margins of film 35 around the rectangular image frame 84 at rectangular aperture 34.

When plate 68 is disengaged from clamping cam 73, release pin 83 is engaged by release pin cam 126 and urged forwardly in bore 82 by a separate release force Fr. Force Fr in conjunction with force F1 causes release pin 83 to engage the force receiving portion of plate 68 in alignment with the pressure point at boss 69, and lift plate 68 to retracted position away from film 35.

Figure 15:
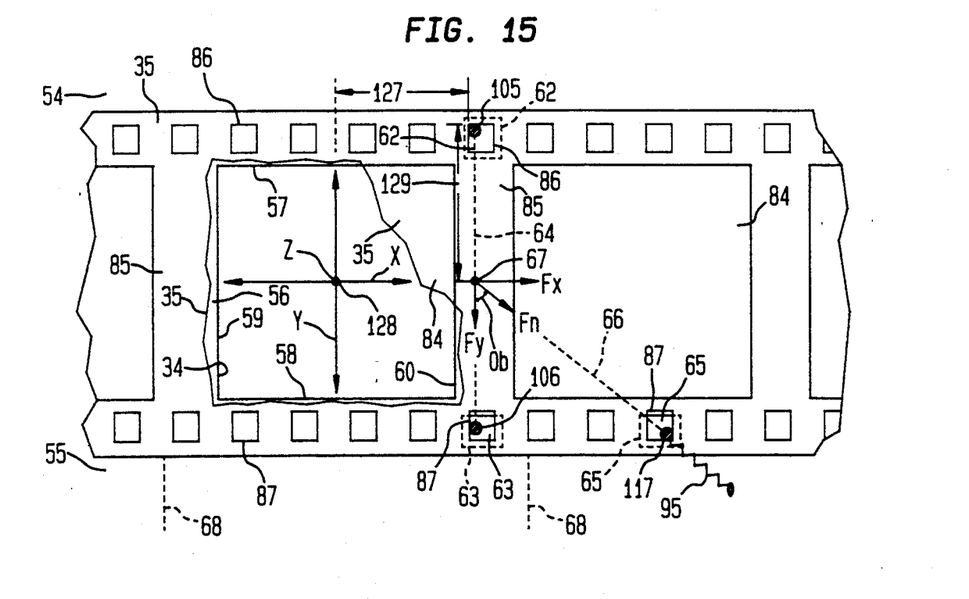
FIG. 15 is a schematic view showing the registering of a strip film image frame by the registration means and pulling means.

Referring now to FIG. 15, an image frame 84 of film 35 is shown in overlying registry with aperture 34, in a condition in which first, second and third pins 105, 106 and 117 have entered corresponding perforations 86, 87 and 87a and reached first, second and third recesses 62, 63 and 65, with third pin 117 being pulled by spring 95 in oblique direction 66 at an oblique angle Ob with respect to reference line 64 to produce a resultant nesting force Fn from midpoint 67, composed of Fx and Fy force components. Force Fn applied to film 35 resolves at midpoint 67 which is located at a distance 127 in the direction of longitudinal axis X between reference line 64 and the Z axis center 128 of aperture 34, and at a distance 129 in the direction of transverse axis Y between midpoint 67 and center 128.

Force Fn, as applied by spring 95 to third pin 117 acting on the perforation 87a that it has entered and engaged, causes the perforation 86 entered and engaged by first pin 105 to be nested or cornered on first pin 105 under a longitudinal force component and a transverse force component. It also causes the perforation 87 entered and engaged by second pin 106 to abut thereagainst under a longitudinal force component. The image frame 84 is thereby precisely registered with aperture 34 as the positions of pins 105 and 106 relative to aperture 34 are predetermined and fixed. The perforations at first and second pins 105 and 106 are isolated thereby in exact alignment longitudinally in the direction of axis X, i.e., parallel to reference line 64, as the common remote longitudinal sides of the perforations are pulled by the force of spring 95 longitudinally against first and second pins 105 and 106. The perforation at the first pin 105 is also in exact alignment transversely in the direction of axis Y, i.e., centered at midpoint 67 and thus also at center 128, as the remote transverse side of the perforation thereat is pulled by the force of spring 95 transversely against the first pin 105. First pin 105 acts as a cornering pin to register the image frame 84 precisely with aperture 34. The second pin 106, operating in perforation 63 merely prevents the rotation of the image frame 84 about axis Z.

The method of operation contemplates steps (A), (B) and, optionally, (C). Step (A) comprises isolating longitudinally the pair of transversely aligned perforations 86 and 87 of film 35 by first and second pins 105 and 106 at first and second points along reference line 64 extending transversely of the longitudinal direction of the film and positioned at a fixed longitudinal location adjacent aperture 34 so as to register the image frame 84 therewith.

Step (B) comprises pulling the perforation isolated film at a third point spaced longitudinally from the second point under a tension force in direction 66 oblique to reference line 64 to produce a resultant force Fn on the perforation 86 at the first point and on the perforation 87 at the second point for registering precisely the image frame with the aperture by the pins.

Step (C) comprises clamping the film adjacent the aperture for maintaining the image frame in precise focal position thereat.

As is clear from FIG. 15, the tension force is applied by spring 95 to produce a resultant force Fn on film 35 at transverse midpoint 67 in alignment with reference line 64 and corresponding to a combination of longitudinal force component Fx and transverse force component Fy acting on the perforation 86 at the first point to corner the perforation against first pin 105 in both longitudinal and transverse X and Y axes directions, and longitudinal force component Fx acting on the perforation 87 at the second point to align the perforation against second pin 106 in the longitudinal X axis direction.

Generally, force component Fx has a greater magnitude than force component Fy because longitudinal force component Fx must seat both perforations 86 and 87 against both first and second pins 105 and 106. Transverse force component Fy need only seat perforation 86 against first pin 105. In the nested condition of film 35, second pin 106 is spaced from both longitudinal sides of perforation 87 while first pin 105 is spaced from the longitudinal side of perforation 86 opposite its nested longitudinal side.

Pins 105, 106 and 117 are undersized relative to perforations 86 and 87, and recesses 62, 63 and 64. Pins 105 and 106 are also undersized relative to clamp holes 89 and 90. Thus, excess pin and perforation wear and perforation tearing are avoided. This especially true since the pins are generally restricted to only one degree of freedom, i.e., to move in given Z axes directions. It is only after third pin 117 enters its adjacent perforation 87 and reaches a substantially static condition that it is unlocked to exert an oblique pulling force on the perforation.

The controlled locking and unlocking of the third pin as earlier described completely avoids excess wear thereof. Until it enters the adjacent perforation, the third pin is locked against movement in X and Y axes directions. When unlocked for movement in X and Y axes directions under the pulling force of spring 95, the third pin is essentially stationary in a Z axis direction.

First and second pins 105 and 106, which have no degrees of freedom in the X and Y axes directions, serve to locate the image frame 84 in the X and Y axes directions, and at a conjoint rotational position about a corresponding Z axis. Third pin 117 under the oblique pulling force of spring 95 serves to apply resultant force Fn, i.e., in a direction substantially parallel to film 35, to cause first pin 105 to locate film 35, and thus the image frame 84 at aperture 34, in the X and Y directions, and second pin 106 to locate the film at the conjoint rotational position about a Z axis coaxial with first pin 105.

Since the pins are undersized relative to the perforations, the pins may be retracted freely, i.e., without pulling the film to strip the perforations from the pins. This also avoids excess pin and perforation wear and perforation tearing.

After step (A), step (B) may be effected before or after step (C). According to a special feature, as discussed below in connection with FIG. 16, steps (B) and (C) may be effected repeatedly sequentially for incrementally increasingly precise image frame registry with and focal positioning at the aperture.

Figure 16:
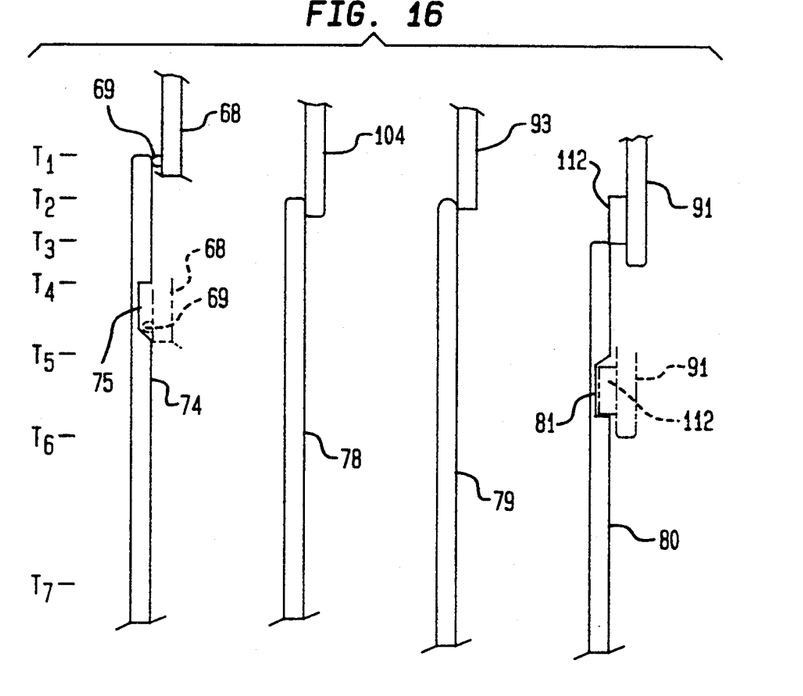
FIG. 16 is a schematic view of the cam operation of the registration means, pulling means and clamping means.

Referring now to FIG. 16, there is shown schematically the timing stages T1, T2, T3, T4, T5, T6 and T7 for engaging cam edge 74 and cams 78, 79 and 80 with boss 69 of plate 68, cam follower 104, holding sheet 93, and cam follower 112 of locking sheet 91, as the case may be, during rotation of gate member 31.

At stage T1, clamping cam edge 74 engages boss 69 to clamp plate 68 against film 35. At stage T2, registration cam 78 engages cam follower 104 to move first and second pins 105 and 106 to enter adjacent perforations. At about the same time, holding cam 79 engages holding sheet 93 to move post 109 and third pin 117, and simultaneously to move locking sheet 91 therewith, a first increment so that third pin 117 enters an adjacent perforation unreleased from locking opening 113. At stage T3, locking cam 80 engages cam follower 112 to move locking sheet 91 a second further increment to release locking opening 113 from post 109 for exerting a pulling force on third pin 117 by spring 95.

According to a special feature, at least one clamping cam notch 75 is located in cam edge 74 (see FIG. 3) and at least one locking cam notch 81 is located in locking cam 80 (see FIGS. 5–7 and 9) at selective successive positions therealong. At stage T4, as boss 69 reaches a clamping cam notch 75, it is temporarily released from clamping force to allow spring 95 to pull third pin 117 for registering the image frame 84 at aperture 34 more easily, free from clamping force. At stage T5, at a different point in time, as cam follower 112 reaches a locking cam notch 81, third pin 117 is temporarily locked by upward movement of locking sheet 91 a said second increment to allow film 35 to be clamped by plate 68 more smoothly, free from oblique pulling force.

By one or more sequentially repeated steps of temporarily releasing the clamping force to apply the pulling force undisturbed thereby, and of temporarily relocking third pin 117 to apply the clamping force undisturbed by the pulling force, an increasingly more precise focal positioning seating and registering of the image frame 84 at aperture 34 is incrementally achieved. These alternate pulling and clamping steps eliminate essentially completely any minor bowing or distortion of the image frame at the aperture.

At stages T6 and T7, scanning begins and ends. The gate member is then rotated in reverse direction to unclamp the film and remove the pins for film advance and gate member return to the starting point.

Figure 17:
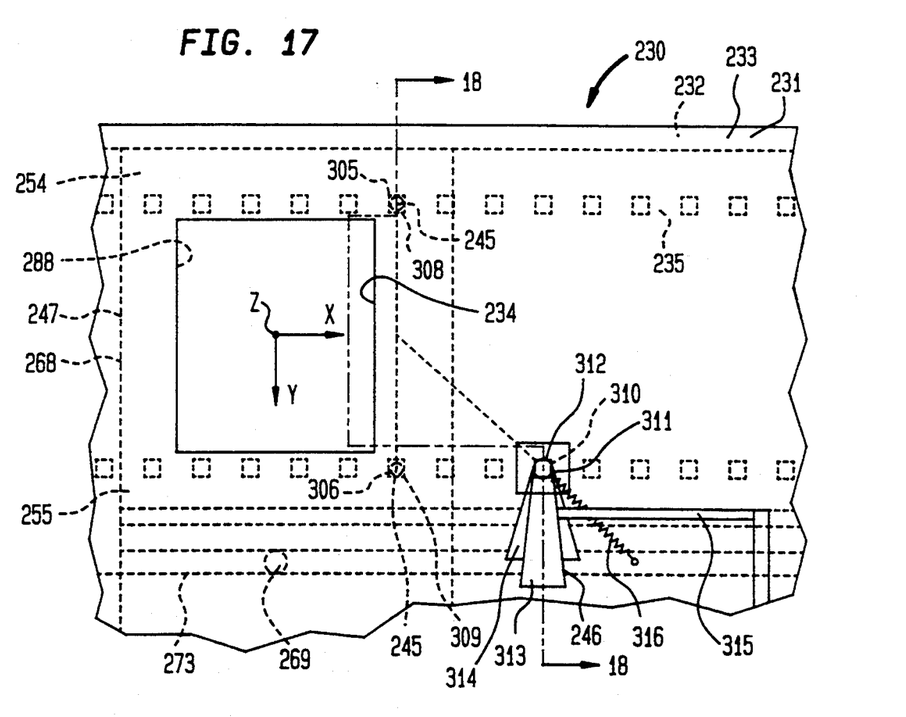
FIG. 17 is a schematic view of the rear side of the gate member in accordance with an alternative embodiment of the invention.
Figure 18:
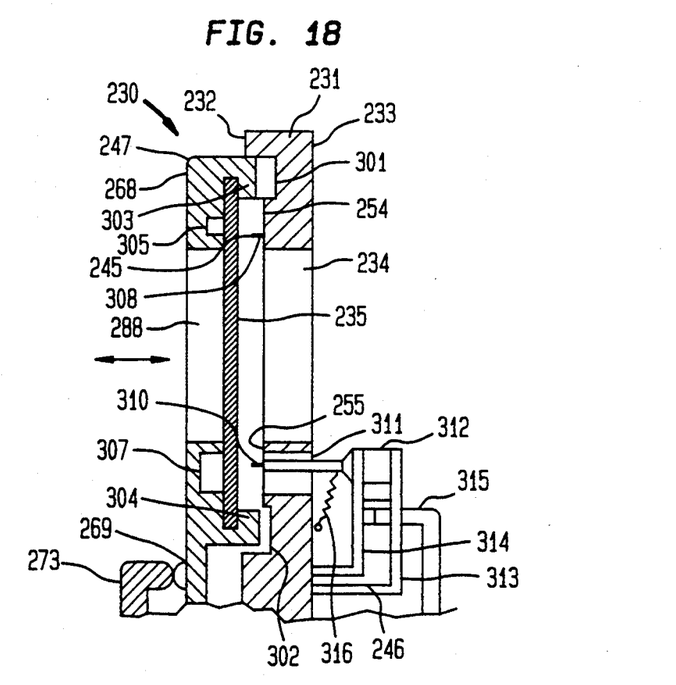
FIG. 18 is a sectional view taken on line 18—18 of FIG. 17.

Referring now to FIGS. 17 and 18, there is shown an alternative embodiment in which analogous parts to those of the embodiment of FIGS. 1–16 have the same numbers preceded by a 2 (200 series numbers), and other parts have other numbers (300 series numbers).

The assembly 230 is essentially the same as the preferred embodiment described above, except that it is directed to a flat gate and carrier wherein the carrier 268 is provided with a pair of flanges 303 and 304 on the back face of the carrier. The flanges engage the lateral edges of the film 235.

The carrier 268 is part of the clamping means 247 and is arranged to move into and out of engagement with the front face 232 of gate member 231 which carries the aperture 234. The carrier 268 has a window 288 that registers with aperture 234. Clamping cam 273 is arranged to engage boss 269 on the carrier to clamp film 235 against first and second surfaces 254 and 255 of front face 232 at aperture 234. The film engaging flanges 303 and 304 enter first and second grooves 301 and 302 in front face 232 of the gate member adjacent first and second surfaces 254 and 255. The carrier 268 has first, second and third recesses 305, 306 and 307 positioned to receive first, second and third pins 308, 309 and 310 on gate member 231, when carrier 268 clamps film 235 against front face 232. The first and second pins 308 and 309 are stationarily fixed on first and second surfaces 254 and 255 and arranged to enter first and second recesses 305 and 306 in carrier 268 when in clamping position.

The pulling means 246 comprises holding and locking sheets 313 and 314 on rear side 233. Post 312 depends from holding sheet 313, passes through a corresponding locking opening in locking sheet 314 and carries third pin 310 in the same way as in the embodiment of FIGS. 1-16. However, post 312 carries third pin 310 so as to extend through a clearance hole 311 in gate member 231 to front side 232. A pulling spring 316 is fixed to rear face 233 and connected to post 312 to act on third pin 310 in an oblique pulling direction. Third pin 310 is arranged to enter third recess 307 in carrier 268 when in clamping position. Hole 311 and third recess 307 are sized for unhindered movement of third pin 310 in the oblique pulling direction. Locking cam 315 is arranged to depress locking sheet 314 to release post 312 to permit spring 316 to pull third pin 310 in the oblique direction. Holding sheet 313 remains undepressed throughout. Locking cam 315 serves only to release third pin 310 for pulling film 235 whereas clamping cam 273 serves to clamp carrier 268 to bring film 235 against first and second surfaces 254 and 255. Upon such clamping, first, second and third pins 308, 309 and 310 on gate member 231 enter first, second and third recesses 305, 306 and 307 in carrier 268. Then, post 312 is released by action of locking cam 315 on locking sheet 314 to permit spring 316 to pull third pin 310 in the oblique direction.

The flanges 303 and 304 of the carrier 268 captively and slidingly holds both edges of film 235 for retracting it from gate member 231 and away from the pins 308 and 309 for film advance, yet when clamped against the gate member the carrier holds the film in proper focal position for the described purposes.

Other mechanisms than fixed motor driven cam mechanisms shown can be used to operate the registration means, pulling means, clamping means and release pin, such as solenoid and/or lever drives, hydraulic rams, belt drives and the like. Conventional control means are used to control the assembly for relative movement, and to operate the clamping means, registration means, pulling means and release pin.

Also, while the force producing means is described above as a pulling means and is shown in the form of a pin that engages a perforation for pulling the film in the oblique direction, other means for gripping and pulling the film under resilient tension may be used as the pulling means. Moreover, other means for applying force to the film, either at a perforation or along the edge of the film may be employed and may push or pull on the film to seat the registration pins in the perforations.

Any other moving means than flexure sheets may be used to move the pertinent portions of the registration means, pulling means, and clamping means, so long as they serve to move them in a Z axis direction while preventing displacement in the X and Y axes directions.

The assembly of the invention achieves extremely precise location of the image frame at the gate member aperture and maintains the image frame registered with the aperture in extremely straight disposition along the scan line so as to remain in sharp focus during, e.g., high resolution electronic, scanning, printing, recording, or like operations. Stringent tolerances of total film flatness of 0.002 inch, and frame to frame registration at the gate aperture within 0.00025 inch (one pixel) are attainable therewith, while avoiding excess pin and perforation wear and perforation tearing.

Due to the fixed location of the first and second pins coaxial with the first and second points in corresponding Z axis directions, and their restraint from displacement in X and Y axes directions, all image frames are registered in precisely the same position at the aperture. This occurs via nesting of the perforation at said points in precisely the same positions against said pins.

The gate member of the assembly of the invention may be used with strip film having any number of perforations per image frame increment, such as 4 or 8 perforations per successive image frame. However, the gate member and associated parts may be exchanged with another to accommodate a different type film, e.g., having a different perforation style and/or image frame length. The compact arrangement of the registration means, pulling means and clamping means permits positioning of the assembly in close proximity to the elements of the scanning or other system.

A curved gate member is typically more desirable for scanning purposes, due to the high accuracy of positioning the image frame at the aperture to maintain sharp focus of all portions thereof during relative movement between the gate member and scanner or other system used. However, the gate member may also be of flat configuration as conventionally used for scanning operations.

Accordingly, it can be appreciated that the specific embodiments described are merely illustrative of the general principles of the invention. Various modifications may be provided consistent with the principles set forth.

What is claimed is:

1. A method for positioning at a focal positioning location longitudinally successive, uniform rectangular image frames on a strip film bounded between a pair of parallel rows of equidistant, uniform rectangular edge perforations of common cross sectional size, each perforation in one row being transversely
aligned with a corresponding perforation in the other row, said method comprising the steps of:
(A) isolating longitudinally a pair of transversely aligned film perforations of the strip film by first and second pins at first and second points along a reference line extending transversely of the longitudinal direction of the strip film and positioned at a fixed longitudinal location adjacent the positioning location so as to register a film frame with the positioning location; and
(B) applying a force to said film at at least a third point spaced longitudinally from the second point to create a force in a direction oblique to the reference line to produce a resultant force on the perforation at the first point and on the perforation at the second point for registering precisely said film frame with the positioning location by the pins.

2. The method of claim 1 wherein the step of applying includes producing a resultant force on the film at a transverse midpoint in alignment with the reference line and corresponding to a combination of a longitudinal force component and a transverse force component acting on the perforation at the first point to corner the perforation against the first pin in both longitudinal and transverse directions, and a longitudinal force component acting on the perforation at the second point to align the perforation against the second pin in the longitudinal direction.

3. The method of claim 1 including the step of:
(C) clamping the film adjacent the positioning location for maintaining the frame in precise focal position at the positioning location wherein step (B) is effected before step (C).

4. The method of claim 3 wherein steps (B) and (C) are effected repeatedly sequentially for incrementally increasingly precise frame registry with and focal positioning at the positioning location.

* * * * *